J. REEDY.
Plow-Fender.

No. 64,707.

Patented May 14, 1867.

Witnesses:

Inventor:

United States Patent Office.

JACOB REEDY, OF TOLEDO, IOWA.

Letters Patent No. 64,707, dated May 14, 1867.

---

PLOUGHS.

---

The Schedule referred to in these Letters Patent and making part of the same.

---

TO ALL WHOM IT MAY CONCERN:

Be it known that I, JACOB REEDY, of Toledo, in the county of Tama, and State of Iowa, have invented a new and useful Improvement in Double-Shovel Ploughs; and I do hereby declare that the following is a full, clear, and exact description of the same, reference being had to the annexed drawings, making a part of this specification, in which—

The same letters are employed in both figures in the indication of the same parts.

Figure 1:
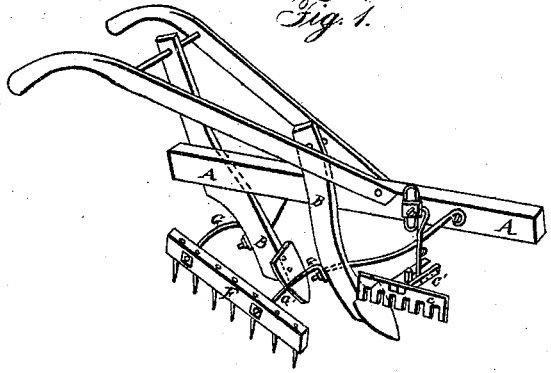
Figure 1 is a perspective view.
Figure 2:
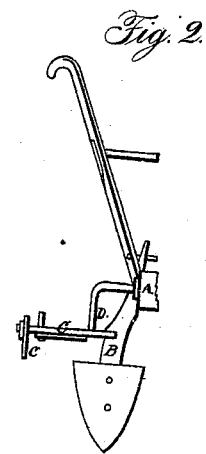
Figure 2 is a front elevation of a part of the plough.

A is the beam and B the shovel of the plough, which, being of ordinary construction, need not be described. These ploughs are intended to run between the rows of corn. To protect the corn from the clods of earth thrown to one side by the shovel, I attach to the plough-beam the guard C, which is in the form of a rake, as shown. It has a stem, C', with two arms, by which it is adjustably attached to the hooked arm D by a pivot passing through one of a series of holes in the arms C'. The hooked arm D is shaped as shown in fig. 2, and is adjustably attached to the beam A, as shown in fig. 1, by a set-screw, E, passing through an eye or slot in the upper end thereof. This guard may be set nearer to or further from the shovel, as required, by changing the pin into the different holes in the arms C'. The end of the arm D extends beyond the opening between the arms C', so as to support the guard and prevent its falling below the line of the horizontal part of the arm D. The hooked portion of the arm D rising between the arms C' prevents any action forward or back, while the guard may rise freely, turning upon its pivot, so as to accommodate itself to inequalities in the surface. F is the pulverizer, which is formed like a rake, and is arranged diagonally in rear of the shovels, to the standards of which it is attached by the braces G and G', which pass through the rake-head, and to which the pulverizer is attached adjustably by nuts on each side of the head working on to the thread of a screw cut in the ends of the braces G and G', so that the pulverizer may be brought nearer to or set further from the shovels, as may be necessary. The object of the pulverizer is to break up the clods of earth thrown up by the shovels and draw them towards the middle of the space between the rows of corn.

What I claim as my invention, and desire to secure by Letters Patent, is—

1. The guard C adjustably attached to the beam or standard of a shovel-plough, so as to operate substantially in the manner and for the purpose set forth.

2. The pulverizer F, adjustably attached to the standards or beam so as to operate in rear of the shovels of a plough, substantially in the manner and for the purpose set forth.

In testimony whereof I have signed my name to this specification in the presence of two subscribing witnesses.

JACOB REEDY.

Witnesses:
 JOHN CONNELL,
 C. P. N. BARKER.